(12) United States Patent
Palfai et al.

(10) Patent No.: US 9,797,479 B1
(45) Date of Patent: Oct. 24, 2017

(54) COMPACT DUAL SPEED GEAR ASSEMBLY

(71) Applicant: Atieva, Inc., Menlo Park, CA (US)

(72) Inventors: Balazs Palfai, Dublin, CA (US); Luis A. Riera, Belmont, CA (US); Michael Tebbe, Hayward, CA (US)

(73) Assignee: ATIEVA, INC., Menlo Park, CA (US)

( * ) Notice: Subject to any disclaimer, the term of this patent is extended or adjusted under 35 U.S.C. 154(b) by 0 days.

(21) Appl. No.: 15/377,205

(22) Filed: Dec. 13, 2016

(51) Int. Cl.
F16H 3/44 (2006.01)
F16H 3/54 (2006.01)
F16D 41/04 (2006.01)
F16D 25/12 (2006.01)
F16D 25/10 (2006.01)
F16D 41/066 (2006.01)

(52) U.S. Cl.
CPC .............. *F16H 3/54* (2013.01); *F16D 25/10* (2013.01); *F16D 25/12* (2013.01); *F16D 41/04* (2013.01); *F16D 41/066* (2013.01); *F16H 2200/0034* (2013.01); *F16H 2200/2005* (2013.01); *F16H 2200/2069* (2013.01); *F16H 2200/2084* (2013.01)

(58) Field of Classification Search
CPC .......... F16H 48/24; F16H 48/10; F16H 48/34; F16H 3/54; F16H 2200/2084; F16H 2200/0034; F16H 2200/2005; F16H 2200/2069; F16D 27/09; F16D 11/14; F16D 41/04; F16D 25/12; F16D 25/10; F16D 41/066
See application file for complete search history.

(56) References Cited

U.S. PATENT DOCUMENTS

| 7,938,041 | B1* | 5/2011 | Shiigi | F16D 27/10 |
| | | | | 192/35 |
| 2007/0163854 | A1* | 7/2007 | Irikura | B60K 17/3505 |
| | | | | 192/50 |
| 2009/0199678 | A1* | 8/2009 | Irikura | F16H 48/16 |
| | | | | 74/650 |
| 2013/0071263 | A1* | 3/2013 | Hwang | F16D 41/066 |
| | | | | 417/223 |

* cited by examiner

Primary Examiner — David J Hlavka
(74) Attorney, Agent, or Firm — Patent Law Office of David G. Beck

(57) ABSTRACT

A dual speed gearbox is provided that utilizes hydraulically actuated one way clutches and a planetary gear assembly to shift between a direct drive configuration and an overdrive configuration.

20 Claims, 7 Drawing Sheets

US 9,797,479 B1

COMPACT DUAL SPEED GEAR ASSEMBLY

FIELD OF THE INVENTION

The present invention relates generally to a vehicle and, more particularly, to a compact dual speed gear assembly well suited for use in an electric vehicle.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups.

The electric drive trains used in electric vehicles (EVs) have proven to be highly reliable and capable of providing exceptional performance. Additionally, since electric motors generate useable torque and power over a very wide range of motor speeds, they do not require a multi-speed transmission such as those required by a conventional vehicle powered by an internal combustion engine.

While a multi-speed gearbox may not be required in a vehicle with an electric drive train, such a gearbox can be used to enhance an EV's performance, both in terms of acceleration and top speed. Accordingly, what is needed is a multi-speed gearbox that is small, lightweight, efficient and capable of handling the torque supplied by the motor in an electric vehicle. The present invention provides such a gearbox.

SUMMARY OF THE INVENTION

The present invention provides a dual speed gear assembly that includes an input gear rotatably mounted to a stationary hub, and an output gear. Preferably the input and output gears of the dual speed gear assembly correspond to the idler input gear and idler output gear of an idler assembly.

The dual speed gear assembly further includes a dual clutch assembly that is housed within the input gear. The dual clutch assembly is comprised of (i) a clutch shell; (ii) a first assembly of one way clutches, where the first assembly of one way clutches is located between an inner surface of the input gear and an outer surface of the clutch shell, and where engagement of the first assembly of one way clutches locks the input gear to the clutch shell; and (iii) a second assembly of one way clutches, where the second assembly of one way clutches is located between an inner surface of the clutch shell and an outer surface of the stationary hub, and where engagement of the second assembly of one way clutches locks the clutch shell to the stationary hub.

The first assembly of one way clutches may be comprised of a first plurality of one way clutches which, when engaged, lock the input gear to the clutch shell when the input gear rotates in a first direction about the clutch shell, and a second plurality of one way clutches which, when engaged, lock the input gear to the clutch shell when the input gear rotates in a second direction about the clutch shell, where the first and second directions are opposite from one another. Each one way clutch of the first assembly of one way clutches may further comprise a clutch pin located between the inner surface of the input gear (e.g., the clutch cam reactor surface) and the outer surface of the clutch shell (e.g., the clutch cam surfaces), a clutch actuator (e.g., a hydraulic actuator), and a clutch pin tensioner (e.g., a spring). Each clutch actuator in the first assembly of one way clutches is operable in a first mode where the actuator is inactive and in a second mode where the actuator is active. When the clutch actuator is inactive, the clutch pin tensioner forces engagement of the clutch pin, thereby locking the input gear to the clutch shell. When active, the clutch actuator forces disengagement of the clutch pin.

The second assembly of one way clutches may be comprised of a first plurality of one way clutches which, when engaged, lock the clutch shell to the stationary hub when the clutch shell rotates in a first direction about the stationary hub, and a second plurality of one way clutches which, when engaged, lock the clutch shell to the stationary hub when the clutch shell rotates in a second direction about the stationary hub, where the first and second directions are opposite from one another.

Each one way clutch of the second assembly of one way clutches may further comprise a clutch pin located between the inner surface of the clutch shell (e.g., the clutch cam surfaces) and the outer surface of the stationary hub (e.g., the clutch cam reactor surface), a clutch actuator (e.g., a hydraulic actuator), and a clutch pin tensioner (e.g., a spring). Each clutch actuator in the second assembly of one way clutches is operable in a first mode where the actuator is inactive and in a second mode where the actuator is active. When active, the clutch actuator forces engagement of the clutch pin, thereby locking the clutch shell to the stationary hub. When the clutch actuator is inactive, the clutch pin tensioner forces disengagement of the clutch pin.

The dual speed gear assembly further includes a planetary gear assembly housed within the output gear. The planetary gear assembly is comprised of (i) sun gear rigidly coupled to the stationary hub (for example, utilizing a weld joint); (ii) a plurality of pinion gears, where each pinion gear meshes with the sun gear and with a ring gear, where the ring gear corresponds to the inner surface of the output gear; and (iii) a planetary carrier rigidly coupled to the input gear, where each of the plurality of pinion gears is rotatably mounted to the planetary carrier. Each pinion gear may be held within the planetary carrier via a back bearing hub, and held within a carrier cover via a front bearing hub. Preferably the planetary carrier is integral to the front face of the input gear.

The dual speed gear assembly may further comprise a first bearing assembly that is mounted to the bearing mounting collar of the output gear, and a second bearing assembly that is mounted to a bearing support member that is rigidly coupled (for example, via a weld joint) to the input gear.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
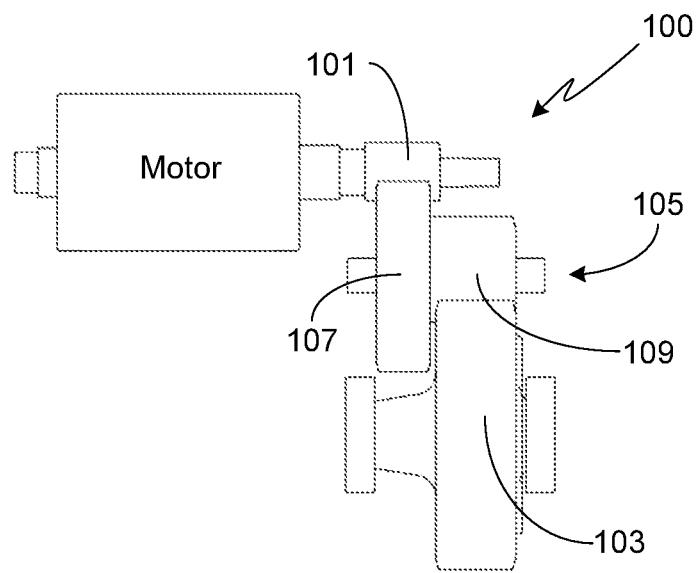
FIG. 1 provides a simplified side view of an electric drive train.

FIG. 1 provides a side view of an electric drive train 100. For purposes of clarity, this figure does not show gear teeth. As shown, input gear 101 is coupled to differential gear 103 via idler gear assembly 105. The two speed gear assembly of the present invention, described in detail below, is designed to occupy the same space and volume as that required by a conventional idler gear assembly. As a result of this design, different vehicle models can be offered with only minor modifications to the gearbox, including idler assembly replacement, thereby allowing vehicle product line expansion at minimal cost (e.g., a base model and a two-speed high performance model).

The two-speed gear assembly of the present invention includes a dual clutch assembly that is housed within the idler input gear 107, and a planetary gear assembly that is primarily contained within the idler output gear 109. The dual clutch assembly allows selection between a direct drive configuration, thereby provide rapid acceleration, and an overdrive configuration that provides enhanced high speed performance. The dual clutch and planetary gear assemblies are described in detail below.

Figure 2:
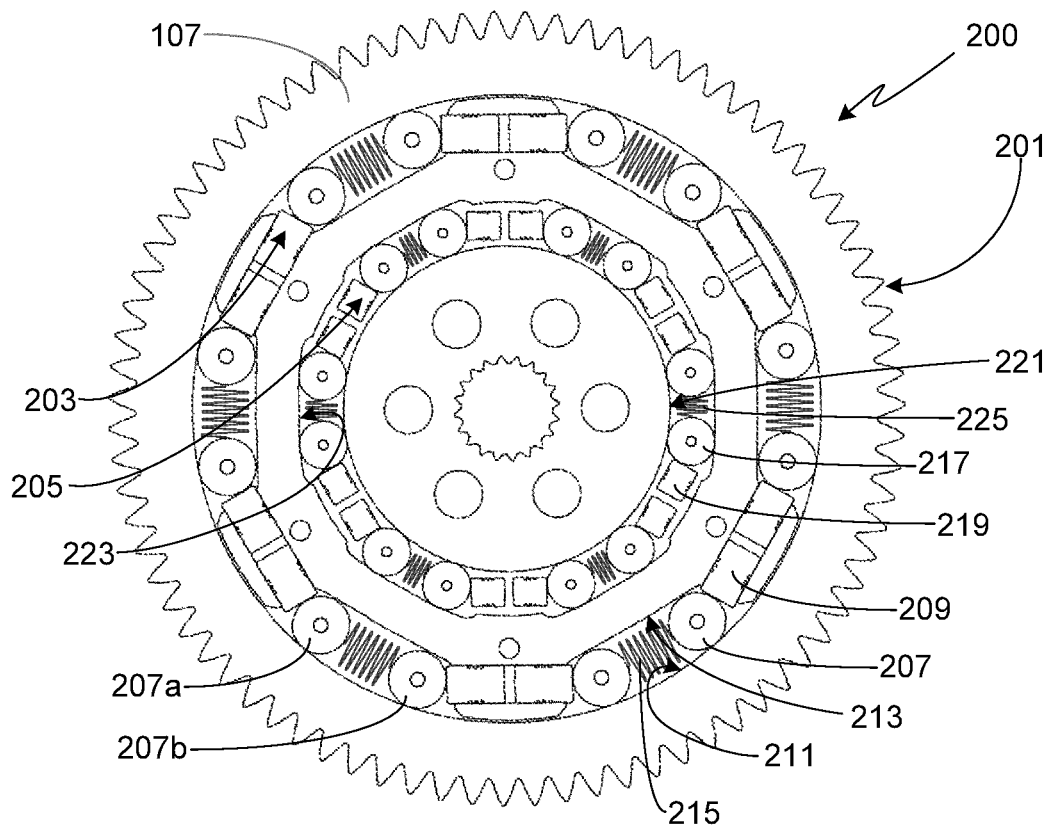
FIG. 2 provides a cross-sectional view of a dual clutch assembly in accordance with a preferred embodiment of the invention.

FIG. 2 provides a cross-sectional view of dual clutch assembly 200. Visible in this view are gear teeth 201 corresponding to the assembly's input gear. In the preferred and illustrated embodiment, clutch assembly 200 includes an outer ring 203 of one way clutches and an inner ring 205 of one way clutches. In this embodiment, each ring of one way clutches is comprised of two sets of one way clutches, thereby preventing rotation in either direction once engaged. As shown, each set of one way clutches comprising outer ring 203 includes six one way clutches that prevent rotation in a first direction, and six one way clutches that prevent rotation in a second, opposite direction. Similarly, each set of one way clutches comprising inner ring 205 includes six one way clutches that prevent rotation in a first direction, and six one way clutches that prevent rotation in a second, opposite direction. It should be understood that the number of one way clutches utilized in either ring of clutches may be varied from that shown, depending primarily upon the design goals for the system, the overall dimensions of the dual clutch assembly and the sizing of each individual clutch.

Each individual clutch of outer ring 203 includes a clutch pin 207 and a hydraulic clutch actuator 209. The clutch pin is located between the inner surface 211 of idler input gear 107, which may also be referred to herein as a clutch cam reactor surface, and cam surface 213 of the clutch shell. Interposed between each pair of opposing clutch pins is a tensioner, preferably comprised of a spring 215 (e.g., a compression spring), where the clutch pins comprising each pair of opposing clutch pins are from different one way clutch sets. In other words, clutch pin 207a prevents rotation in a first direction while clutch pin 207b prevents rotation in a second direction, where the first and second rotational directions are opposite to one another.

The individual clutch assemblies comprising inner ring 205 preferably utilize a similar design configuration as the clutch assemblies comprising outer ring 203. Accordingly, each individual clutch within inner ring 205 includes a clutch pin 217 and a hydraulic clutch actuator 219. Each clutch pin 217 is located between outer stationary hub surface 221, also referred to herein as a clutch cam reactor surface, and cam surface 223 of the clutch shell. Interposed between each pair of opposing clutch pins 217 is a tensioner, preferably comprised of a spring 225 (e.g., a compression spring).

In accordance with the invention, the clutch assemblies within one of the rings are configured to be engaged (i.e., locked) while the clutch assemblies within the other ring are configured to be unengaged (i.e., unlocked) when actuators 209 and 219 are off, and reversed when actuators 209 and 219 are activated. Preferably actuators 209 and 219 are hydraulic actuators, although it should be understood that other types of actuators may be used (e.g., pneumatic or electric actuators).

In the preferred embodiment of the invention, when hydraulic pressure is released and actuators 209 and 219 are off (i.e., the hydraulic pistons are in their withdrawn position), cam surfaces 213 and 223 are shaped so that the clutches within the outer ring 203 of clutch assemblies are engaged (i.e., locked) and the clutches within the inner ring 205 of clutch assemblies are disengaged (i.e., unlocked). As previously described, springs 215 insure that clutch pins 207 are engaged when actuators 209 are inactive, and springs 225 insure that clutch pins 217 are disengaged when actuators 219 are inactive. When hydraulic pressure is applied to actuators 209 and 219, thereby causing extension of the corresponding hydraulic pistons, the forces applied by springs 215 and 225 on the corresponding clutch pins is overcome. As a result, each clutch pin 207 is forced towards the adjacent clutch pin 207 and the clutches within the outer ring 203 become disengaged (i.e., unlocked), and each clutch pin 217 is forced towards the adjacent clutch pin 217 so that the clutches within the inner ring 205 become engaged (i.e., locked).

Figure 3:
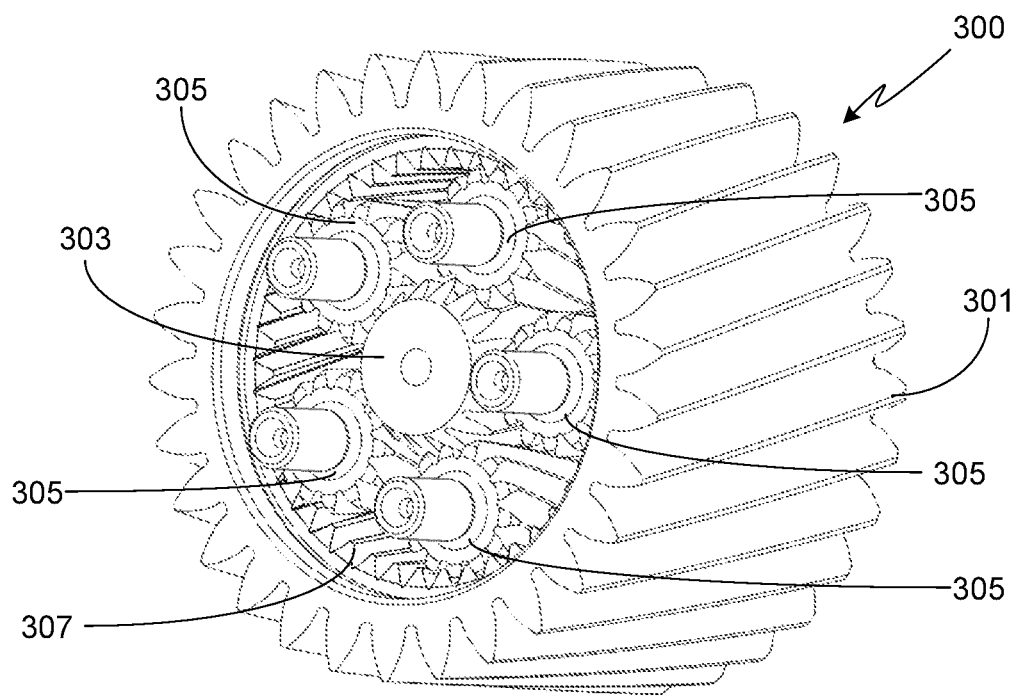
FIG. 3 provides a perspective view of the planetary gear assembly housed within the idler output gear.
Figure 4:
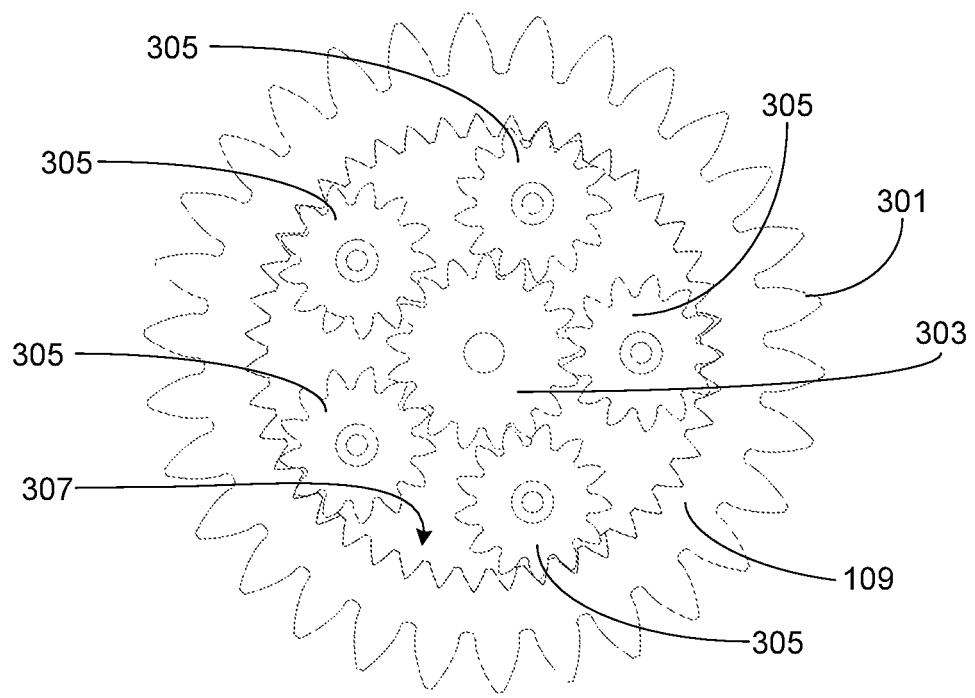
FIG. 4 provides a cross-sectional view of the planetary gear assembly shown in FIG. 4.

FIG. 3 provides a perspective view of the planetary gear assembly 300 housed within the idler output gear 109. A cross-sectional view of this same gear assembly is shown in FIG. 4. Visible in both FIGS. 3 and 4 are the teeth 301 of the idler output gear 109, sun gear 303, and planetary pinion gears 305. While this assembly includes five pinion gears, it will be appreciated that a fewer or greater number of pinion gears may be used in the planetary gear assembly, depending upon the dimensions of the various gears comprising the assembly. The inner surface 307 of idler output gear 109 corresponds to the ring gear of planetary gear assembly 300.

Figure 5:
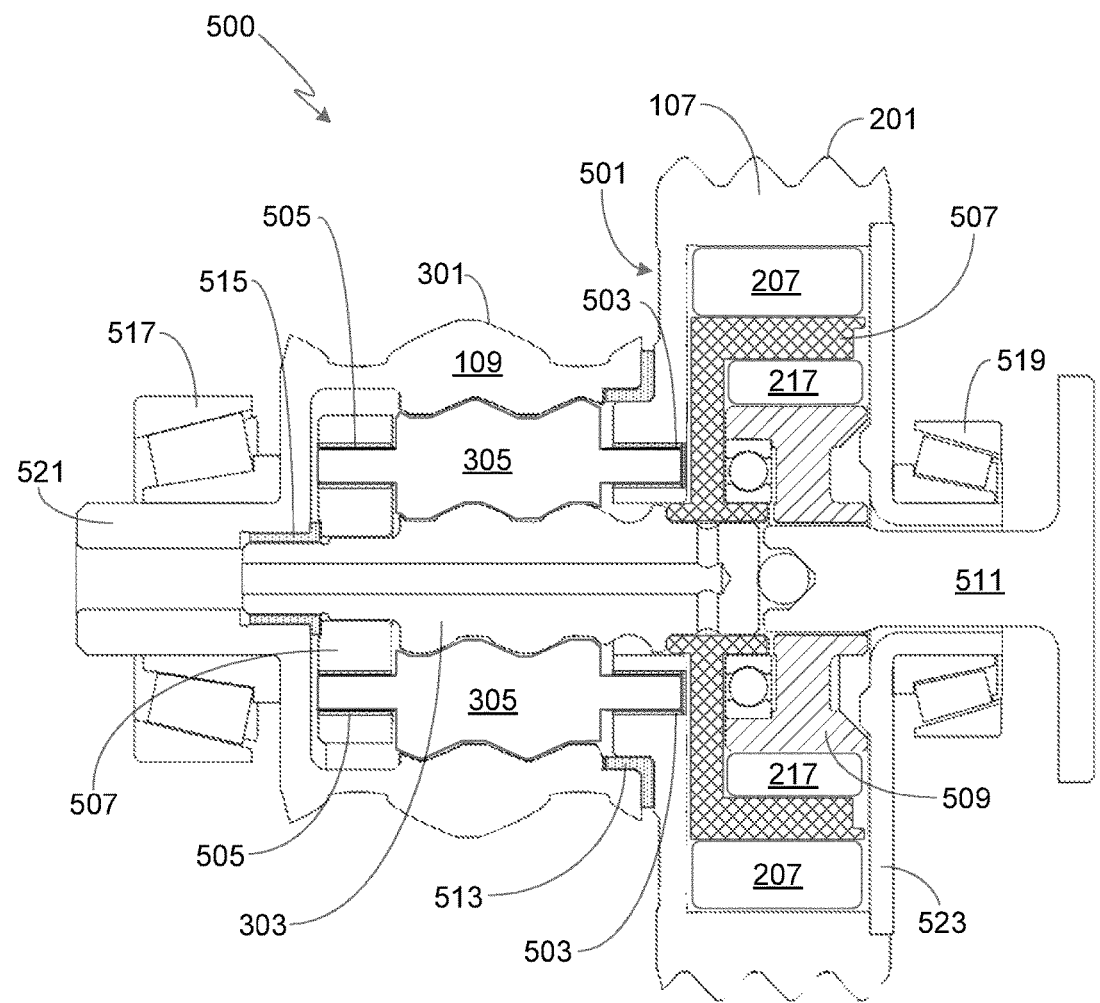
FIG. 5 provides a cross-sectional view of the two speed gear assembly of the invention, where the cross-section is taken through the hydraulic actuators.
Figure 6:
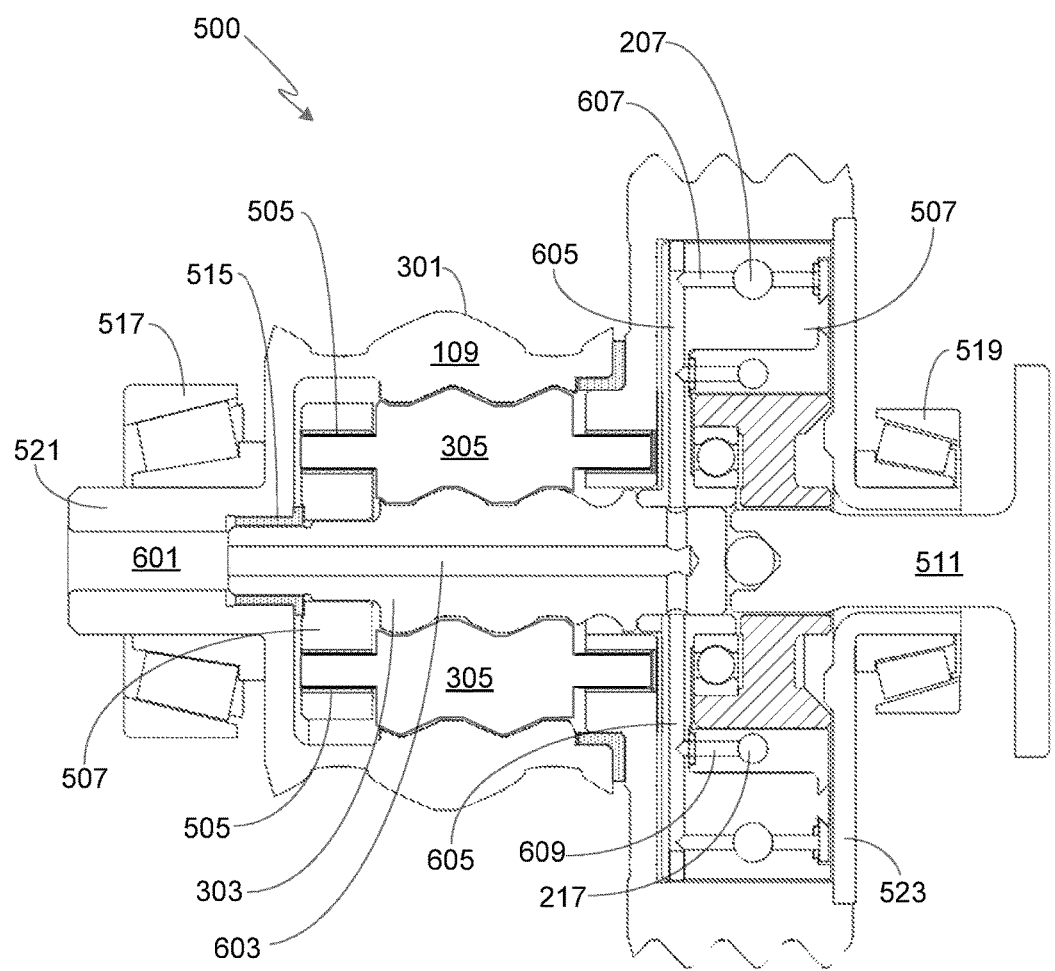
FIG. 6 provides a cross-sectional view of the two speed gear assembly of the invention, where the cross-section is taken through the hydraulic fluid pathways.

FIGS. 5 and 6 provide cross-sectional views of the two speed gear assembly, where the presented views are orthogonal to the cross-sectional views shown in FIGS. 2 and 4. FIG. 5 provides a cross-section taken through the hydraulic actuators, while the view provided in FIG. 6 illustrates the hydraulic fluid pathways.

As shown in the figures, the planetary gear assembly 300 is directly coupled to dual clutch assembly 200. The front face 501 of the clutch assembly, and more specifically, the front face 501 of the idler input gear 107, acts as the planetary pinion carrier and includes the back bearing hubs 503 for the planetary pinion gears 305. The front bearing hubs 505 are held by carrier cover 507. Sun gear 303, which passes through front face 501 of idler input gear 107, is rigidly coupled to the clutch shell 507. The rigid coupling between sun gear 303 and clutch shell 507 is preferably formed using a weld joint, although other means such as fabricating them as a single piece or bolting the two components together may also be used to achieve the desired rigid coupling. Clutch shell 507 is coaxially aligned with hub 509 which, in turn, is rigidly fixed to stationary post 511. Idler output gear 109, the inner surface 307 of which corresponds to the ring gear of planetary gear assembly 300, rotates about the planetary assembly on bushings 513 and 515. Preferably bushings 513 and 515 are brass bushings. Gear assembly 500 rotates about a pair of bearing assemblies 517 and 519. In the illustrated embodiment, bearing assembly 517 is mounted on collar portion 521 of idler output gear 109, and bearing assembly 519 is mounted on a bearing support member 523 that is rigidly coupled, for example via a weld joint, to idler input gear 107.

As noted above, clutch assembly 200 rotates about stationary hub 509, where hub 509 is rigidly fixed to stationary post 511. When the hydraulic actuators 209 and 219 are inactive, i.e., when there is no hydraulic oil pressure, springs 215 force clutch pins 207 within the outer ring 203 to engage while springs 225 force clutch pins 217 within inner ring 205 to disengage. When clutch pins 207 are engaged, the idler input gear 107 is locked to clutch shell 507, thereby allowing direct drive operation of the gear assembly which is preferred for both lower speeds and high acceleration rates. When the hydraulic actuators 209 and 219 are activated, i.e., when there is sufficient hydraulic oil pressure to activate the actuators, the forces applied by springs 215 and 225 are overcome. As a result, clutch pins 207 are disengaged and clutch pins 217 are engaged. This arrangement allows idler input gear 107 to freely rotate about clutch shell 507 while locking the clutch shell, and thus sun gear 303, to stationary hub 509. This mode of operation is preferred for high speed travel.

FIG. 6 provides a similar cross-sectional view as that provided by FIG. 5, except that the cross-section through the clutch shell 507 is taken such that it shows the hydraulic fluid pathways. Initially the hydraulic fluid (e.g., oil) passes through the coaxially aligned passageway 601 in collar 521 of idler output gear 109. Then the fluid passes through coaxially aligned passageway 603 in sun gear 303. The hydraulic fluid then passes into clutch shell 507 where it fans out via passageways 605 before flowing into actuators 207 via passageways 607, and flowing into actuators 217 via passageways 609.

Figure 7:
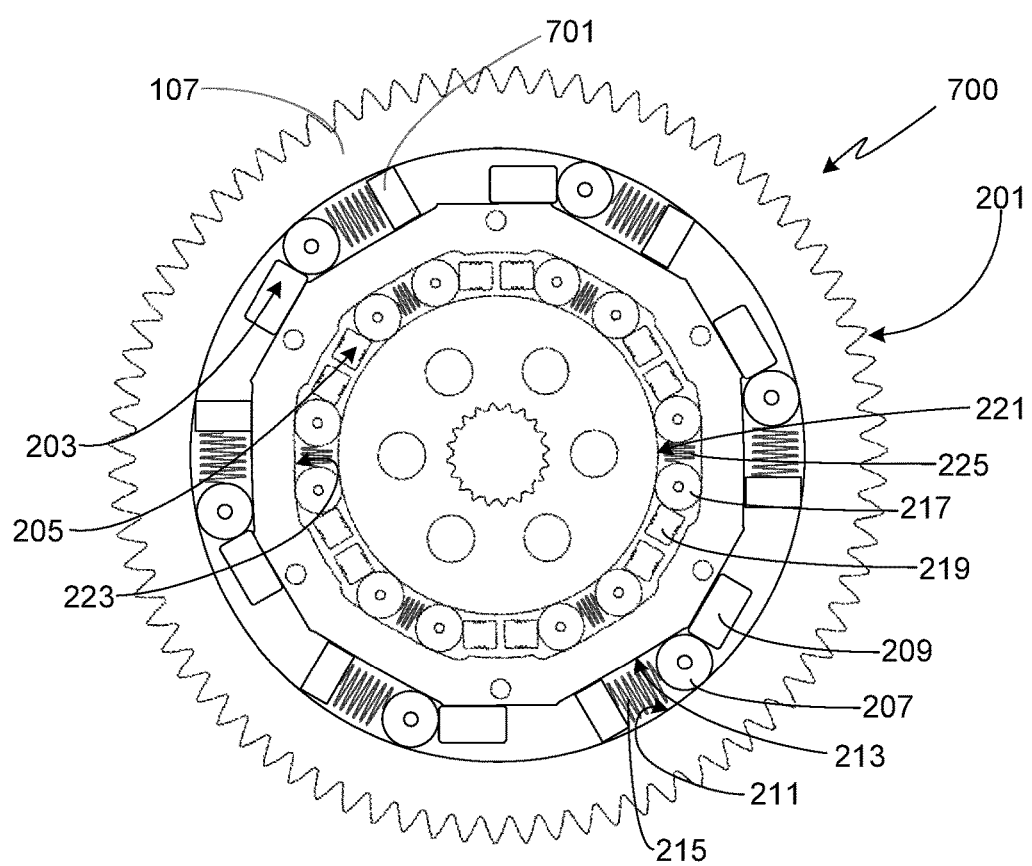
FIG. 7 illustrates a modification of the dual clutch assembly shown in FIG. 2, the modified configuration including a single set of one way clutches within the outer clutch ring.
Figure 8:
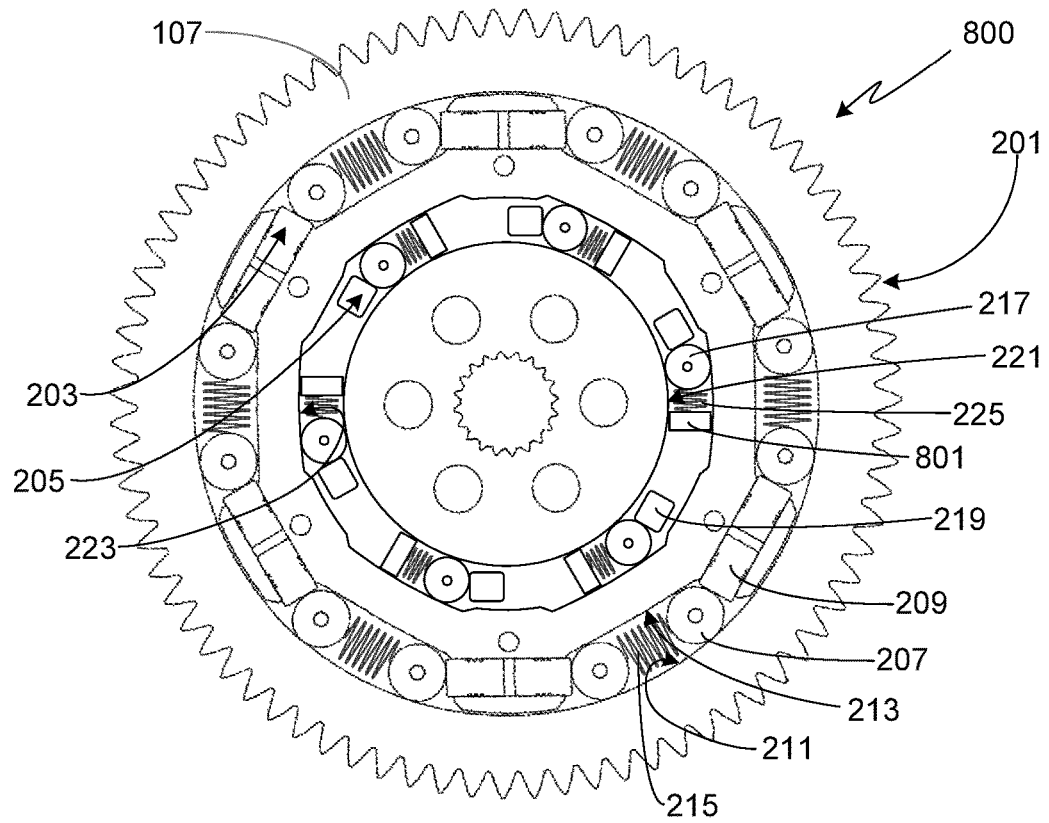
FIG. 8 illustrates a modification of the dual clutch assembly shown in FIG. 2, the modified configuration including a single set of one way clutches within the inner clutch ring.
Figure 9:
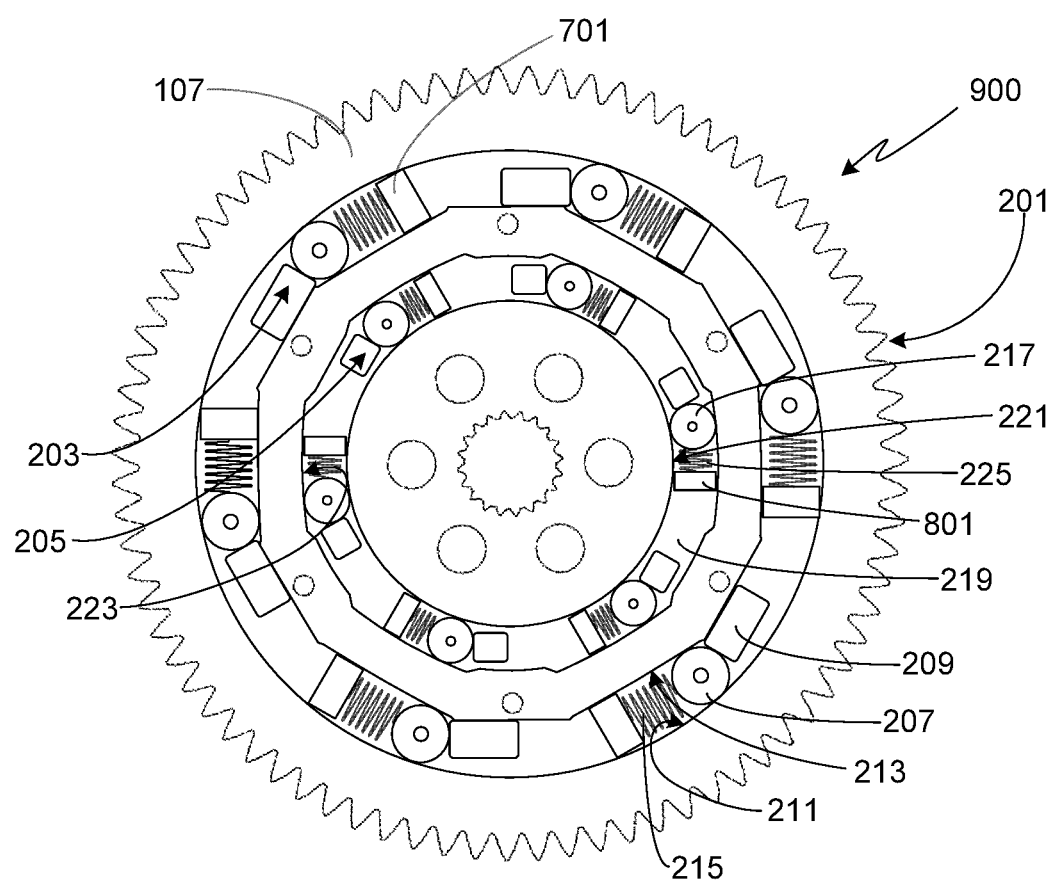
FIG. 9 illustrates a modification of the dual clutch assembly shown in FIG. 2, the modified configuration including a single set of one way clutches within the outer clutch ring and a single set of one way clutches within the inner clutch ring.

It will be appreciated that the configuration described above, while preferred, may be modified to alter system operation. For example, by eliminating one set of one way clutches in the outer ring 203, or eliminating one set of one way clutches in the inner ring 205, or eliminating one set of one ways clutches in both the outer ring 203 and the inner ring 205, a free spinning, neutral state can be achieved. Such a design may be used, for example, to increase shifting smoothness. Typically the set of one way clutches that is eliminated corresponds to the motor breaking/regeneration set of clutches. FIGS. 7-9 illustrate the modified clutch assemblies described above. Specifically, FIG. 7 illustrates a configuration 700 in which one set of one way clutches has been eliminated from outer ring 203; FIG. 8 illustrates a configuration 800 in which one set of one way clutches has been eliminated from inner ring 205; and FIG. 9 illustrates a configuration 900 in which one set of one way clutches has been eliminated from outer ring 203 and one set of one way clutches has been eliminated from inner ring 205. In each of these configurations, the end of the cam tensioner (i.e., tensioners 215 in the outer ring and tensioners 225 in the inner ring) furthest from the corresponding clutch pin rests against, or is held in place by, a pad or similar structure maintained within the corresponding actuator cavity. In the figures this structure is represented by pads 701 within outer ring 203 and pads 801 within inner ring 205.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A dual speed gear assembly, comprising:
    an input gear rotatably mounted to a stationary hub, wherein housed within said input gear is a dual clutch assembly, said dual clutch assembly comprising:
        a clutch shell;
        a first assembly of one way clutches, wherein said first assembly of one way clutches is located between an inner surface of said input gear and an outer surface of said clutch shell, wherein engagement of said first assembly of one way clutches locks said input gear to said clutch shell; and a second assembly of one way clutches, wherein said second assembly of one way clutches is located between an inner surface of said clutch shell and an outer surface of said stationary hub, wherein engagement of said second assembly of one way clutches locks said clutch shell to said stationary hub; and an output gear, wherein housed within said output gear is a planetary gear assembly, said planetary gear assembly comprising:
  a sun gear rigidly coupled to said clutch shell;
  a plurality of pinion gears, wherein each pinion gear of said plurality of pinion gears meshes with said sun gear and with a ring gear, wherein said ring gear corresponds to an inner surface of said output gear; and
  a planetary carrier rigidly coupled to said input gear, wherein each of said plurality of pinion gears is rotatably mounted to said planetary carrier.

2. The dual speed gear assembly of claim 1, each one way clutch of said first assembly of one way clutches comprising:
  a clutch pin located between said inner surface of said input gear and said outer surface of said clutch shell;
  a clutch actuator; and
  a clutch pin tensioner.

3. The dual speed gear assembly of claim 2, wherein said clutch actuator is operable in a first mode and a second mode, wherein said clutch actuator in said first mode is inactive and in said second mode is active, wherein said clutch pin tensioner forces engagement of said clutch pin and locks said input gear to said clutch shell when said clutch actuator is in said first mode, and wherein said clutch actuator forces disengagement of said clutch pin when said clutch actuator is in said second mode.

4. The dual speed gear assembly of claim 2, said clutch actuator comprising a hydraulic actuator.

5. The dual speed gear assembly of claim 2, said clutch pin tensioner comprising a spring.

6. The dual speed gear assembly of claim 2, said inner surface of said input gear comprising a clutch cam reactor surface, and said outer surface of said clutch shell comprising a plurality of clutch cam surfaces.

7. The dual speed gear assembly of claim 1, each one way clutch of said second assembly of one way clutches comprising:
  a clutch pin located between said inner surface of said clutch shell and said outer surface of stationary hub;
  a clutch actuator; and
  a clutch pin tensioner.

8. The dual speed gear assembly of claim 7, wherein said clutch actuator is operable in a first mode and a second mode, wherein said clutch actuator in said first mode is inactive and in said second mode is active, wherein said clutch actuator forces engagement of said clutch pin and locks said clutch shell to said stationary hub when said clutch actuator is in said second mode, and wherein said clutch pin tensioner forces disengagement of said clutch pin when said clutch actuator is in said first mode.

9. The dual speed gear assembly of claim 7, said clutch actuator comprising a hydraulic actuator.

10. The dual speed gear assembly of claim 7, said clutch pin tensioner comprising a spring.

11. The dual speed gear assembly of claim 7, said inner surface of said clutch shell comprising a plurality of clutch cam surfaces and said outer surface of said stationary hub comprising a clutch cam reactor surface.

12. The dual speed gear assembly of claim 1, said first assembly of one way clutches further comprising:
  a first plurality of one way clutches that lock said input gear to said clutch shell when said input gear rotates in a first direction about said clutch shell and when said first plurality of one way clutches is engaged; and
  a second plurality of one way clutches that lock said input gear to said clutch shell when said input gear rotates in a second direction about said clutch shell and when said second plurality of one way clutches is engaged, wherein said second direction is opposite of said first direction.

13. The dual speed gear assembly of claim 1, said second assembly of one way clutches further comprising:
  a first plurality of one way clutches that lock said clutch shell to said stationary hub when said clutch shell rotates in a first direction about said stationary hub and when said first plurality of one way clutches is engaged; and
  a second plurality of one way clutches that lock said clutch shell to said stationary hub when said clutch shell rotates in a second direction about said stationary hub and when said second plurality of one way clutches is engaged, wherein said second direction is opposite of said first direction.

14. The dual speed gear assembly of claim 1, wherein said input gear corresponds to an idler input gear of an idler assembly, and wherein said output gear corresponds to an idler output gear of said idler assembly.

15. The dual speed gear assembly of claim 1, each one way clutch of said first assembly of one way clutches and each one way clutch of said second assembly of one way clutches further comprising a hydraulic clutch actuator, wherein said sun gear further comprises a first hydraulic fluid passageway, wherein said clutch shell further comprises a plurality of second hydraulic fluid passageways fluidly coupled to said first hydraulic fluid passageway, and wherein said plurality of second hydraulic fluid passageways are fluidly coupled to said hydraulic clutch actuators of said first assembly of one way clutches and said second assembly of one way clutches.

16. The dual speed gear assembly of claim 1, said sun gear rigidly coupled to said clutch shell via a weld joint.

17. The dual speed gear assembly of claim 1, said plurality of pinion gears captured between said planetary carrier and a carrier cover, each pinion gear of said plurality of pinion gears held within said planetary carrier via a back bearing hub, and each pinion gear of said plurality of pinion gears held within said carrier cover via a front bearing hub.

18. The dual speed gear assembly of claim 17, said planetary carrier integral to a front face of said input gear.

19. The dual speed gear assembly of claim 1, further comprising a stationary post, wherein said stationary hub is rigidly coupled to said stationary post.

20. The dual speed gear assembly of claim 1, further comprising a first bearing assembly and a second bearing assembly, said first bearing assembly mounted to a bearing mounting collar of said output gear, and said second bearing assembly mounted to a bearing support member rigidly coupled to said input gear.

* * * * *